7586X
P. I. Clute,
Steam-Boiler Furnace,
Patented May 20, 1833.
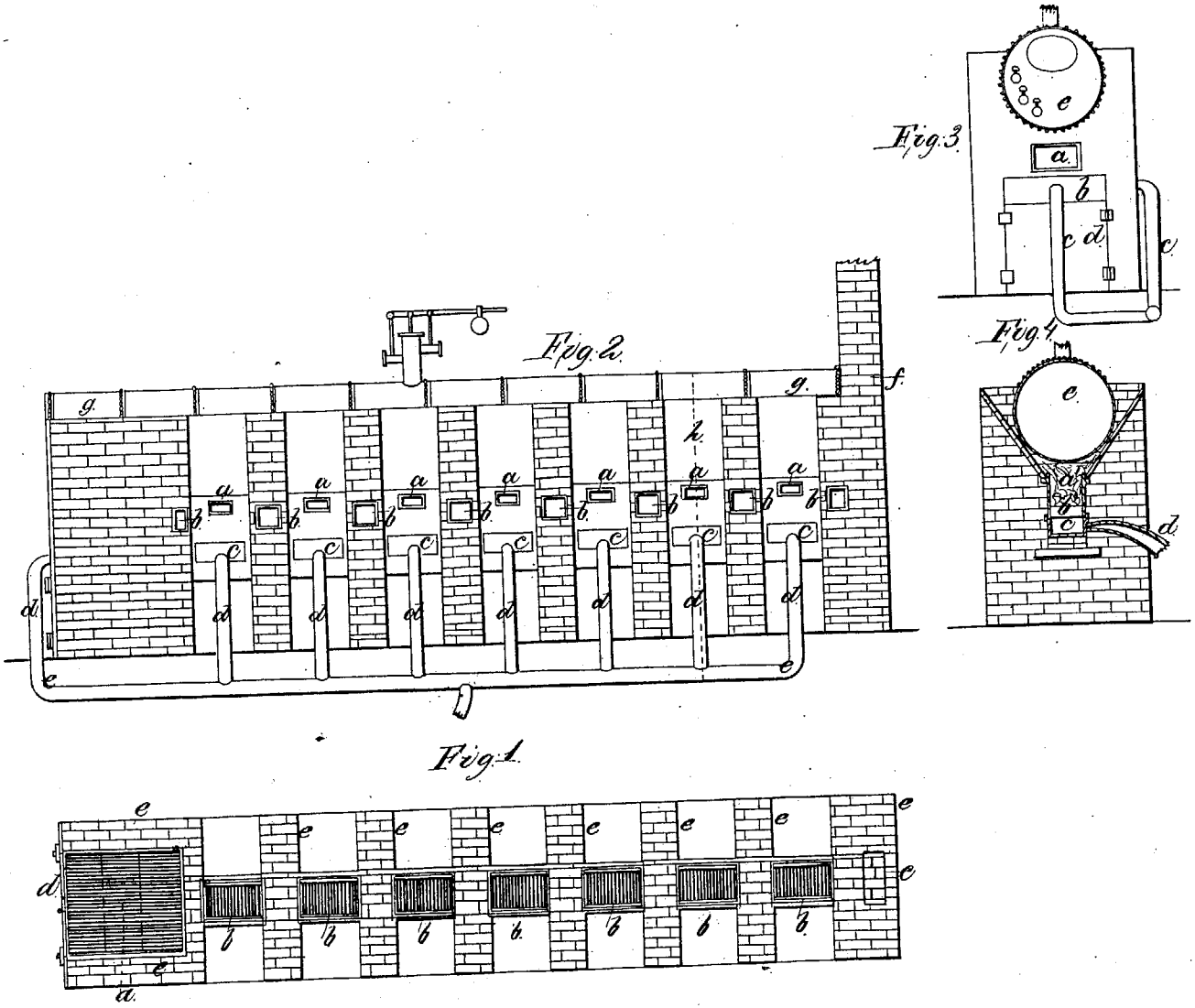
N. PETERS, PHOTO-LITHOGRAPHER, WASHINGTON, D. C.

Peter I Clute of Schenectady New York
Letters Patent.

The schedule referred to in these Letters Patent and making part of the same
containing a description in the words of the said Peter I. Clute himself
of his improvement in the process of generating heat for forging malle-
able iron and generating steam to propel machinery.

Be it known that I Peter I Clute of the City of Schenectady in the
County of Schenectady and State of New York have invented a new and
useful improvement in the art or process of generating heat for forging
maleable Iron and of generating steam to propel machinery for the purpose
of grinding and polishing iron when manufactured and for the other
purposes for which steam power is generally employed
The following is a description of the construction and operation of
the furnaces and apparatus to be used in my invention. Where other
than a cylinder Boiler or where more than one boiler is designed to be
used, a given number of the furnaces of the description herein after
set forth are to be erected and the same arranged in the most convenient
form to receive as many points of the [boiler] boilers as according to the princi-
ples hereinafter laid down may be deemed most expedient as for
example in circular form. The cylinder boiler however I deem
best adapted to the contemplated purposes of my invention.
Where the cylinder boiler is used the number and size of the furna-
ces will vary according to the size of the boiler and the quantity of
steam required to be raised. The furnaces are to be built in a straight
line of uniform width, [length] equidistant and continuous. The boiler to
be laid horizontally or lengthways on the top of the furnaces. There
is an aperture at either end of each furnace thro which the coal
is shovel on the grate and the fires fed as occasion requires.
Under each grate there is a box which I shall designate by the name
of receiver because it receives the blasts from the blow pipe and the
ashes falling through the grate. The receiver may be taken out and [illegible]
when necessary. Each receiver has at one of its sides an aperture for

[illegible]

receiving a branch of the blow pipe. There are of course as many branches
to the main blow pipe as there are furnaces and the blow pipe is
connected with the bellows which is worked by the steam the heat of
the furnaces generate. The branch blow pipe enters the receiver about
at its centre at a point equidistant from the grate and the bottom
of the receiver thus causing the wind in the receiver to circulate
equally. There is an aperture near the top of the furnace in
front through which to protrude the iron to be heated. This aperture
may be closed by a valve when not used.

Let the cylinder Boiler be 20 feet long and two and a half feet in
diameter, then there ought to be about ten furnaces, and the proportions
of the different parts of the furnaces &c ought to be as nearly as may
be as follows – distance between the grate and the boiler twelve inches –
length of grate eighteen inches, width of grate eight inches, width of the
furnace to correspond with the size of the grate, the aperture at either end
to admit the coal is to be eight inches in width and six inches in
height. the receiver eight inches in width and six inches in height,
aperture for receiving the blow pipe one inch and an half in diameter
aperture through which to heat the iron intended to be worked six inches
in width and three inches in height – distance between each grate three eighths
of an inch. diameter of blow pipe four inches and diminished to one inch
and an half at the entrance into the receiver. The strength of the blast re-
quired is equal to that of a blacksmiths fire. The degree of heat may be
regulated by valves placed in the blow pipe. [illegible] I do not claim to have dis-
covered or invented anything new in the construction of the furnaces abstractly con-
sidered or many of the apparatus connected with the steam engine, nor can
my invention in strictness be considered an improvement of a machine or instru-
ment previously patented nor can it be considered an application of an old instru-
ment or machine to a new purpose. What I claim as new and my own
invention may be reduced to the following particulars.

1st The using a number of furnaces to raise steam. 2nd The process of heating
the boiler uniformly at many points thus differing from the universal
practice which now obtains of heating the boiler at one particular point

7586X 3.d The employing the same steam raised by the furnaces in driving the bellows connected with those furnaces. 4.th The application of the blow-pipe to ignite anthracite coal for raising steam. 5.th The using the same fire for the double purpose of raising steam and heating and welding malle- able Iron. I consider these two last particulars the most important and as in especial manner distinguishing my invention from every other, this apparatus possesses a highly important advantage in that it may be used for manifold purposes for the manufacture of maleable iron into the dif ferent articles usually made by blacksmiths, and edge tools, nails &c, and the steam power may be applied to grinding and polishing the iron when manufac- tured, to propelling Boats, driving a trip hammer & mills of every descrip- tion and the other purposes for which steam power is generally employed.

Witnesses
L. H. Boyd
J. H. Yates

Peter I. Clute [illegible]

(1001 Words)

(Granted May 20th 1833)
Iron [illegible]